E. H. ALBERTSON.
TYPE WRITER.
APPLICATION FILED JULY 31, 1912.
1,082,671.
Patented Dec. 30, 1913.
6 SHEETS—SHEET 1.
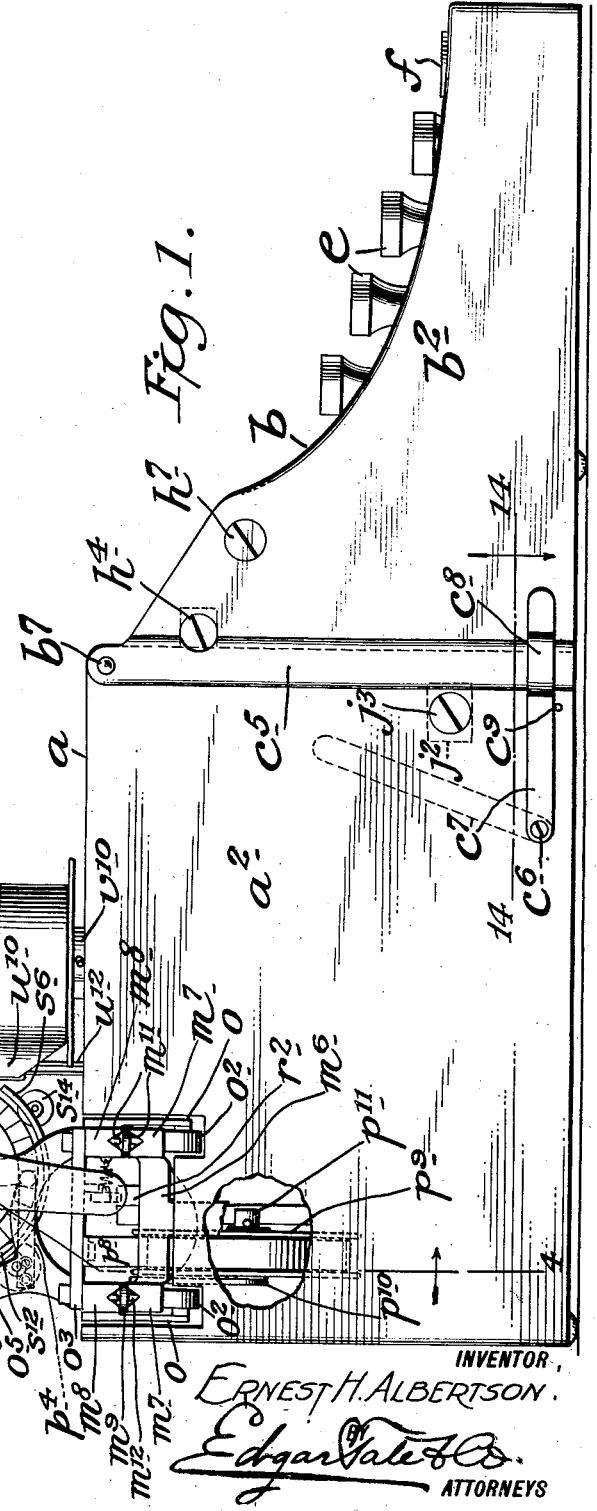
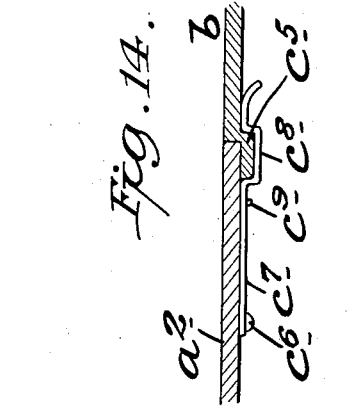
WITNESSES
A.R. Appleman
S. Andrew
INVENTOR
Ernest H. Albertson
Edgar Tate & Co.
ATTORNEYS

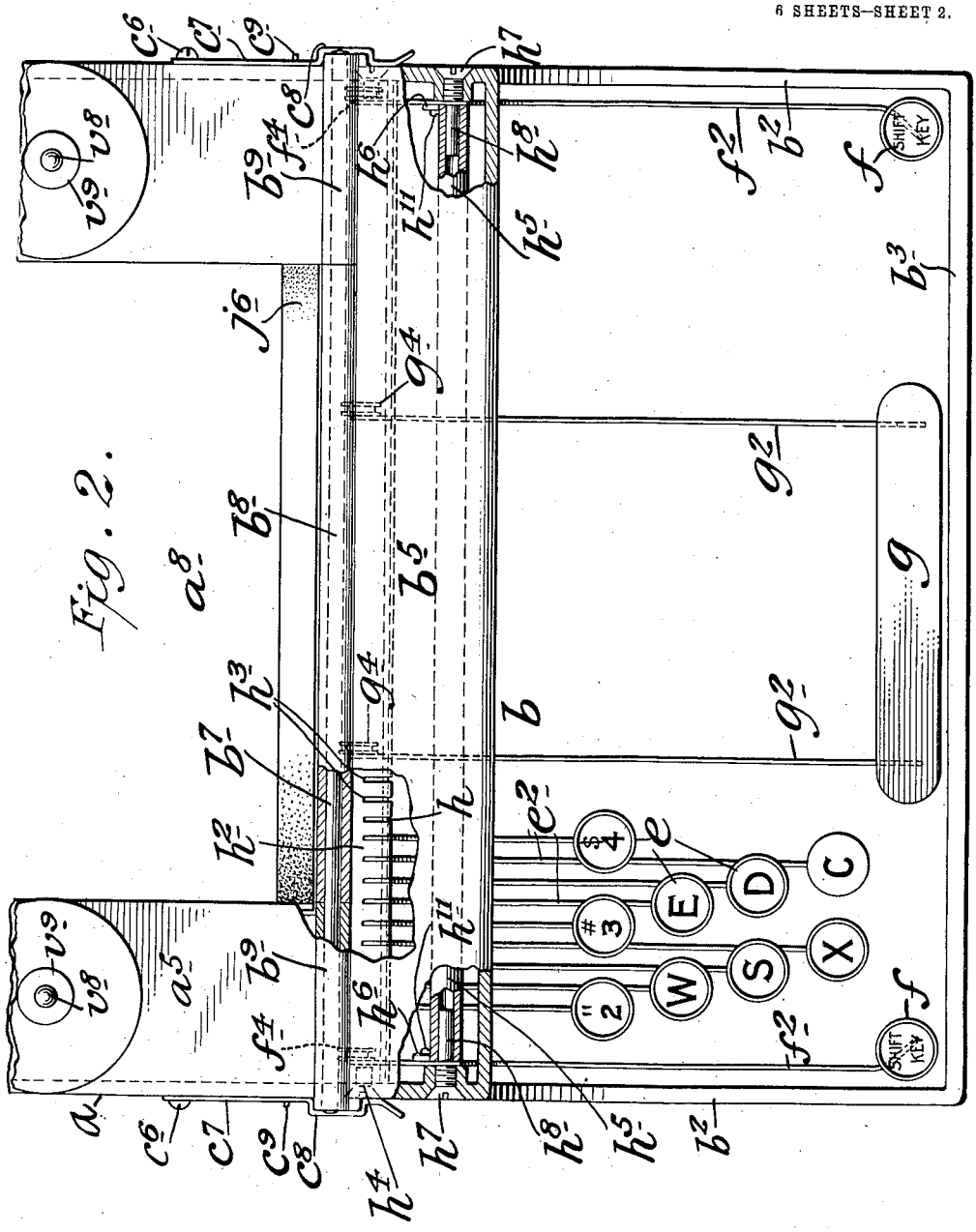

E. H. ALBERTSON.
TYPE WRITER.
APPLICATION FILED JULY 31, 1912.
1,082,671.
Patented Dec. 30, 1913.
6 SHEETS—SHEET 3.
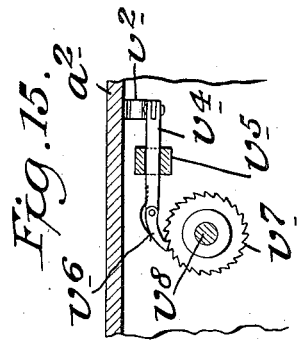
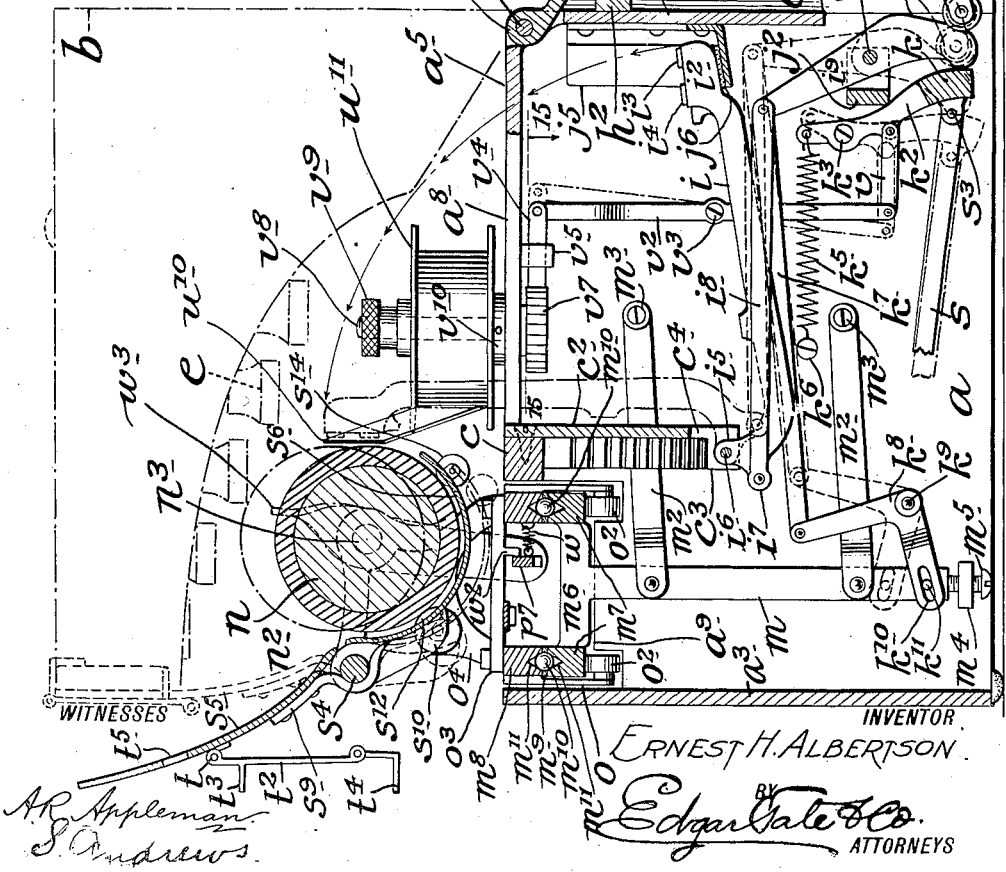
INVENTOR
ERNEST H. ALBERTSON
BY
Edgar Tate & Co.
ATTORNEYS
WITNESSES
A R Appleman
S Andrews

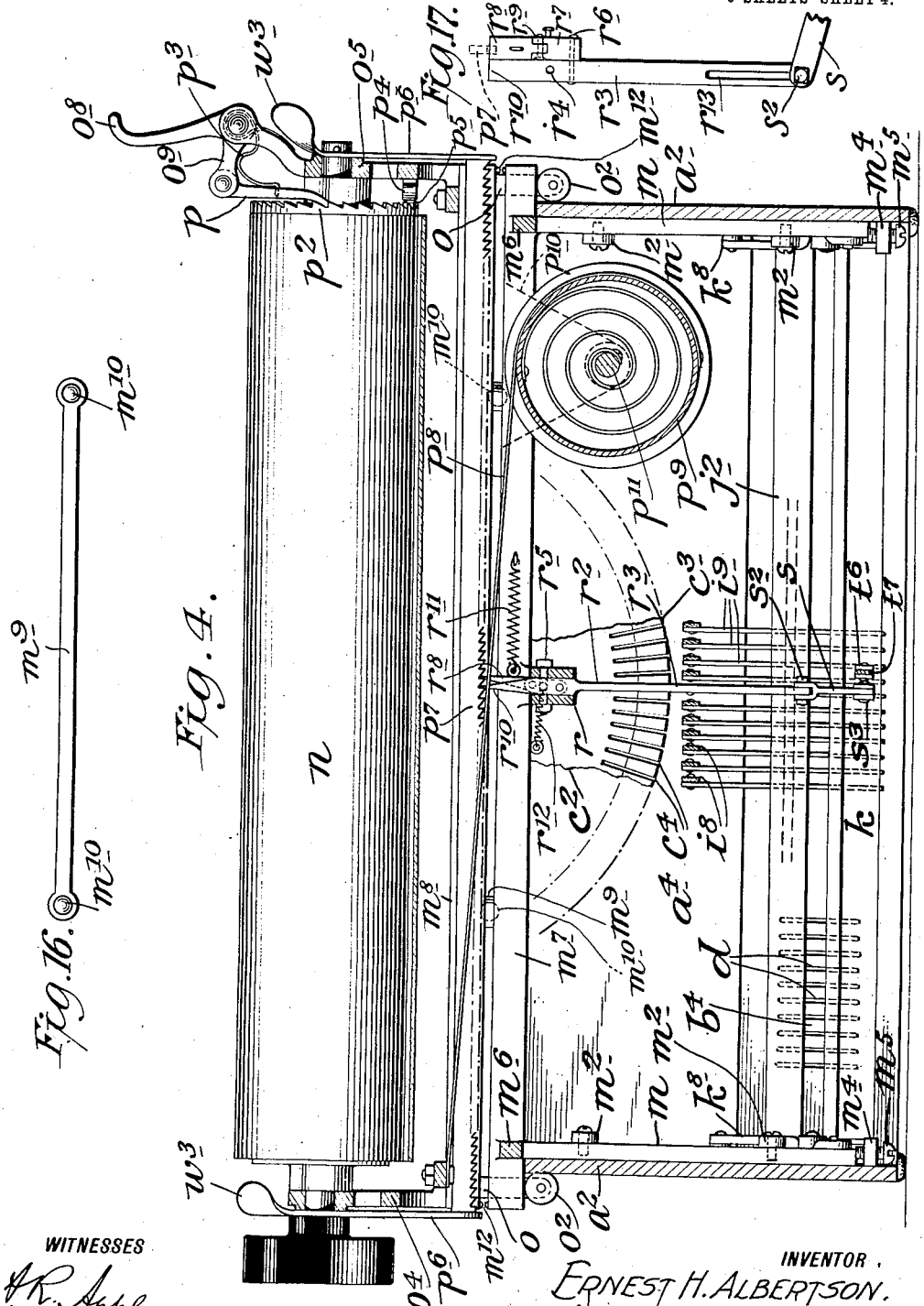

E. H. ALBERTSON.
TYPE WRITER.
APPLICATION FILED JULY 31, 1912.
1,082,671. Patented Dec. 30, 1913.
6 SHEETS—SHEET 5.
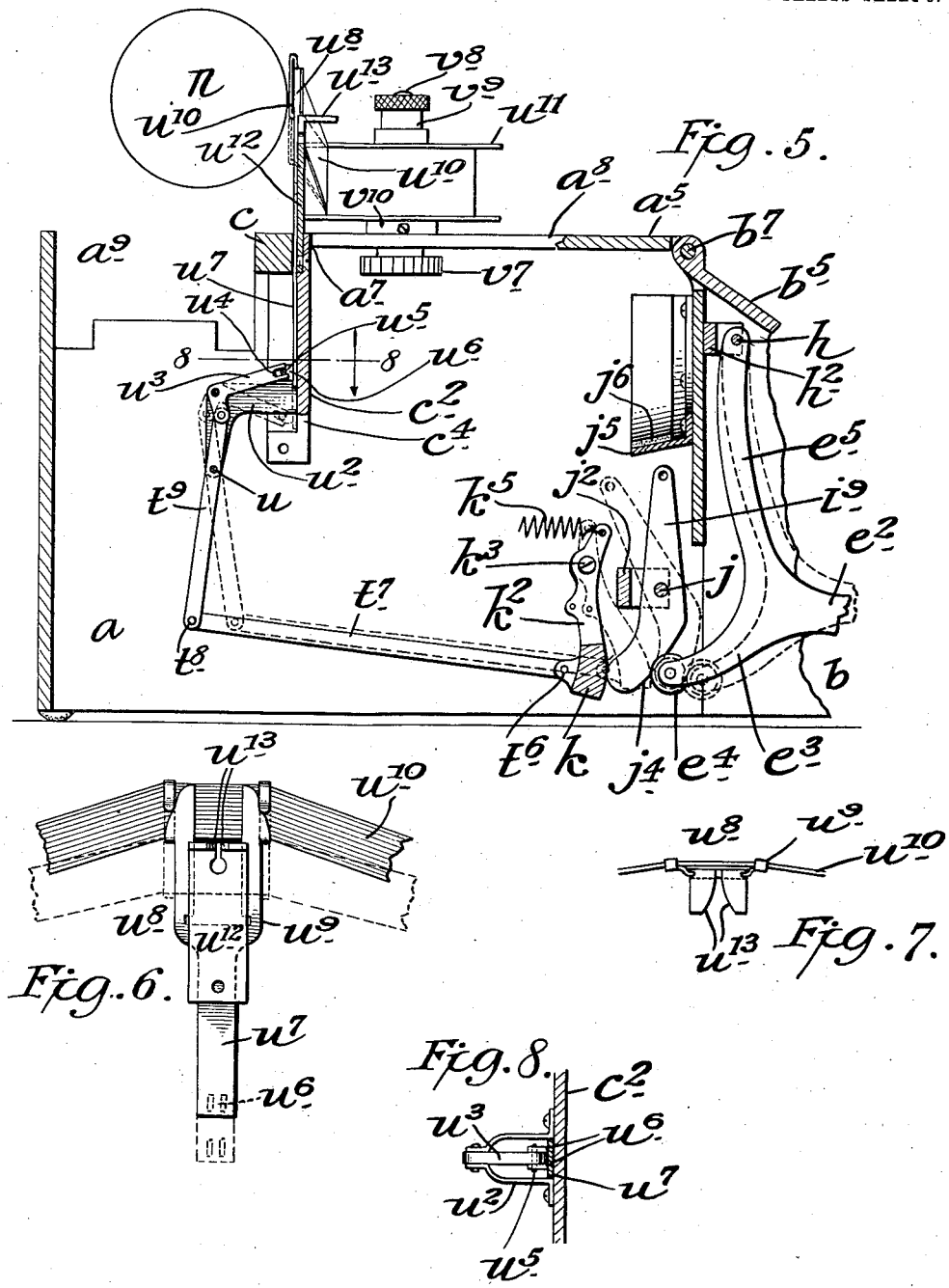
WITNESSES
A. R. Appleman
S. Andrews
INVENTOR
ERNEST H. ALBERTSON.
BY Edgar Tate & Co.
ATTORNEYS E. H. ALBERTSON.
TYPE WRITER.
APPLICATION FILED JULY 31, 1912.
1,082,671.
Patented Dec. 30, 1913.
6 SHEETS—SHEET 6.
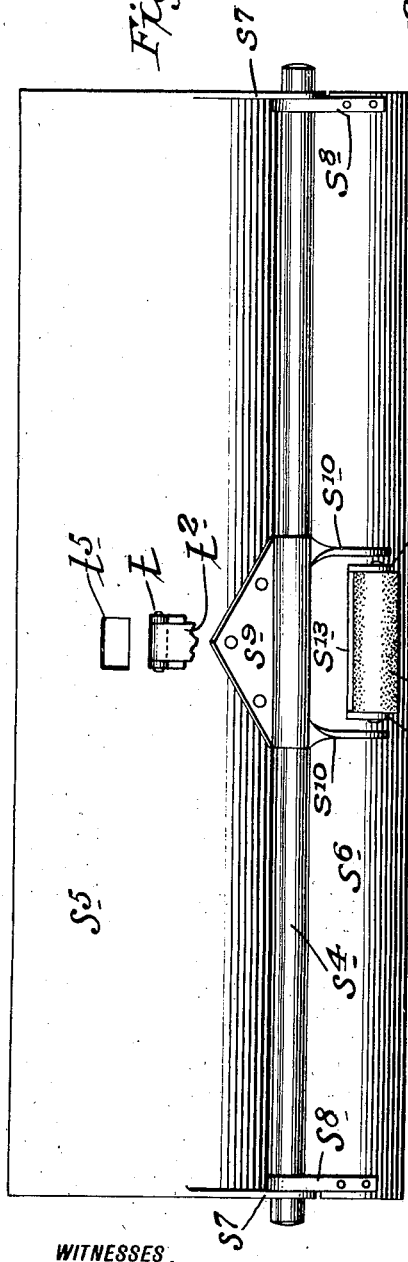
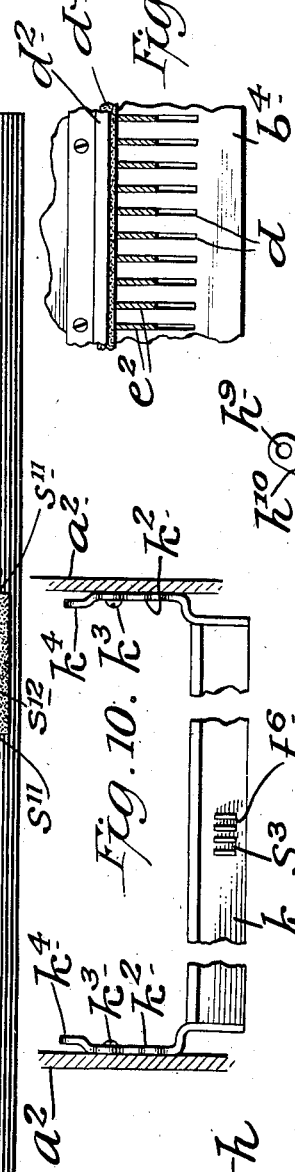
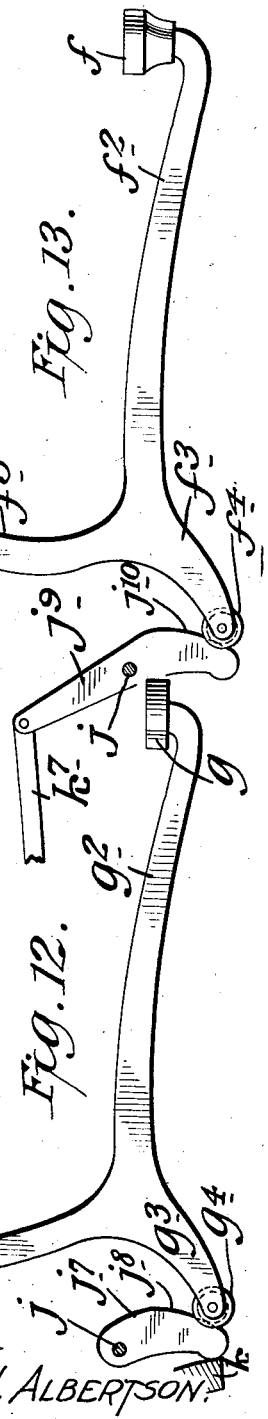
WITNESSES
A. R. Appleman
S. Andrews
INVENTOR.
ERNEST H. ALBERTSON.
BY
Edgar Tate & Co.
ATTORNEYS

UNITED STATES PATENT OFFICE.

ERNEST H. ALBERTSON, OF NEWARK, NEW JERSEY.

TYPE-WRITER.

1,082,671.

Specification of Letters Patent.

Patented Dec. 30, 1913.

Application filed July 31, 1912. Serial No. 712,379.

*To all whom it may concern:*

Be it known that I, ERNEST H. ALBERTSON, a citizen of the United States, and residing at Newark, in the county of Essex and State of New Jersey, have invented certain new and useful Improvements in Type-Writers, of which the following is a specification, such as will enable those skilled in the art to which it appertains to make and use the same.

This invention relates to typewriting machines, and the object thereof is to provide an improved machine of this class having a standard keyboard and the frame of which consists of a main back part and a supplemental front part adapted to be folded backwardly over and on the back part, whereby the machine may be made to occupy the smallest possible space for packing, shipping and carrying purposes, and which when the parts are folded together will be rectangular in form, and may be placed in a box or case of comparatively small dimensions and conveniently transported or carried from one place to another; a further object being to provide a machine of the class specified with an improved key action which is strong and durable, and simple in construction and operation, and which while being particularly adapted to a machine of the two part frame construction specified may also be employed in other machines of this class having the usual frame construction; a further object being to provide a machine having the two part frame construction specified with a key lever construction or action consisting of separate parts, that part which carries the keys being pivoted in the supplemental front frame member and being adapted to be folded backwardly therewith over the back part of the frame in which the other parts of the key action are mounted; a still further object being to provide a typewriting machine with improved means for holding the paper in connection with the platen cylinder and for facilitating its connection with and detachment from said cylinder; and with these and other objects, as hereinafter set out, in view, the invention consists in a typewriting machine constructed and operating as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of my improved typewriting machine with a part of the back frame member broken away; Fig. 2 a plan view of the front part of the machine with parts omitted and parts broken away and in section, and showing the front portion of the back frame member with some of the operative parts connected therewith; Fig. 3 a central vertical longitudinal section through the machine and showing the front frame part with the key levers mounted therein in full lines in their normal position and indicating the same as folded backwardly over the back of the machine in dotted lines; Fig. 4 a partial section on the line 4—4 of Fig. 1; Fig. 5 a view similar to Fig. 3 but showing only details of the construction pertaining to the ribbon shift mechanism and a part of the key bar action; Fig. 6 a front detail view of a part of the ribbon shift mechanism shown in Fig. 5; Fig. 7 a plan view of the construction shown in Fig. 6; Fig. 8 a section on the line 8—8 of Fig. 5; Fig. 9 a back view of the means employed for holding the paper in connection with the platen cylinder and forming a guide therefor; Fig. 10 a rear detail view of the universal bar employed in connection with and as a part of the type bar mechanism; Fig. 11 a partial section on the line 11—11 of Fig. 3; Fig. 12 a side elevation of that part of one of the space key levers mounted in the front part of the frame and two of which are employed; Fig. 13 a side elevation of that part of one of the shift key levers mounted in the front part of the frame and two of which are employed; Fig. 14 a section on the line 14—14 of Fig. 1; Fig. 15 a section on the line 15—15 of Fig. 3; Fig. 16 a plan view of a ball bearing bar two of which are employed in the carriage construction; and, Fig. 17 a side view of a well-known escapement device which controls the movement of the platen cylinder carriage and which is also shown in Fig. 4.

In the practice of my invention, I provide a frame comprising a back part $a$ and a front part $b$, and the back part $a$ comprises similar side plates $a^2$, a back plate $a^3$, a front plate $a^4$, and a top plate $a^5$, and the front plate $a^4$ extends downwardly approximately two-thirds of the height of the frame as shown at $a^6$ in Fig. 3, and the top plate $a^5$ extends backwardly about two-thirds of the forward and backward dimensions of the back frame part as shown at $a^7$, in Fig. 5, and is provided with a large central opening $a^8$. The back part of the frame is open at the top, as shown at $a^9$ in Figs. 3 and 5, and rearwardly of the top plate $a^5$ is a transverse frame bar $c$ which carries a transverse plate $c^2$ at the bottom of which is a segment $c^3$ provided with kerfs or slots $c^4$ in which the rear end portions of the type bars are pivoted, as hereinafter described. The front part $b$ of the frame comprises two similar side plates $b^2$, a front plate $b^3$ and an interior transverse comb plate $b^4$ and a top back plate $b^5$ which is inclined forwardly and downwardly, and is provided with a front downwardly directed plate $b^6$ which overlaps the top of the comb plate to which said comb plate is secured, and said comb plate is made detachable to facilitate the assembling of that part of the operative mechanism mounted in the front part of the frame. The side plates $b^2$ of the front frame member are curved downwardly and forwardly, and at the back edge of the top plate $b^5$ of the front frame member is a transverse rod $b^7$ on which the front frame member is mounted, and the front top portion of the back part of the frame is provided with a central long keeper $b^8$, and the front frame member is provided with two shorter keepers $b^9$ through which the rod $b^7$ passes, and the length of the keeper $b^8$ is preferably the same as the transverse width of the central opening $a^8$ in the top plate of the back frame member, and by means of this construction, the front frame member may be turned backwardly over the back frame member, as indicated in dotted lines in Fig. 3, in order that the machine as a whole may be made to occupy a small rectangular space and be thus capable of being packed in a small rectangular box or case for shipment or other purposes.

In order to provide a finished connection between the front and back frame members when in their operative position, as shown in Fig. 1, I provide the side plates of the front frame member at the back edge thereof with ribs or cleats $c^5$ which overlap the front edges of the side plates of the back frame member, and pivoted to the sides of the back frame member as shown at $c^6$ are spring catches $c^7$ having yoke-shaped loops $c^8$, which are adapted to engage the ribs or cleats $c^5$, as shown in Figs. 1, 2 and 14, so as to hold the front and back frame members in close connection in their operative position and which are adapted to be raised, as indicated in Fig. 1, so as to permit the front frame member to be folded backwardly, and the side plates of the back frame member are provided with stop pins $c^9$ which limit the downward movement of the catches $c^7$.

The transverse plate $b^4$ in the front frame member is provided with equally spaced vertical slots $d$, as shown in Figs. 3, 4 and 11, and at the top of which is secured a transverse keeper $d^2$ in which is secured a transverse buffer strip $d^3$ in connection with which that part of the key levers mounted in the front frame operate.

My machine also involves a standard keyboard comprising the ordinary writing keys $e$, side shift keys $f$, two of which are employed, and a front central transverse space key $g$. The keys $e$ are provided with the usual key levers $e^2$, the shift keys $f$ with the usual shift key levers $f^2$ and the space key $g$ with the usual two space key levers $g^2$ and the key levers $e^2$, $f^2$ and $g^2$ are provided at their rear ends respectively with downwardly and backwardly directed arms $e^3$, $f^3$ and $g^3$ in which are pivoted grooved anti-friction rollers $e^4$, $f^4$ and $g^4$, and said key levers are also provided with upwardly directed arms $e^5$, $f^5$ and $g^5$, and the arms $e^5$, and $g^5$ of the key levers $e^2$ and $g^2$ are pivoted to a transverse rod $h$ in the top back portion of the front frame member, and this rod passes through a transverse bar $h^2$ having kerfs $h^3$, and the bar $h^2$ is held in place, in the construction shown, by screws $h^4$ passed through the side plates of the front frame member into the ends thereof, or in any other desired manner.

Mounted in the top part of the front frame member forwardly of and below the transverse rod $h$ is a transverse tube $h^5$ provided with depending end flanges $h^6$, and this tube is held in place by screws $h^7$ passed inwardly through the side plates of the front frame member and having extensions $h^8$ which enter the ends of said tube, and on which said tube is free to rock. The extensions $h^8$ of the screws $h^7$ also pass through apertures $h^9$ in the ends of the arms $f^5$ of the shift key levers $f^2$, and said arms $f^5$ are provided with small apertures $h^{10}$ through which are passed screws or pins $h^{11}$ which are also passed through the flanges $h^6$ on the ends of the tube $h^5$, and by means of this construction the shift key levers $f^2$ are locked together and to the tube $h^5$, and the depression or operation of either of the shift keys $f$ will operate the other at the opposite sides of the machine as will be readily understood.

That part of the key action mounted in the back frame member is as follows. The key levers $e^2$ in the front part of the frame are represented in the back part of the frame by type bars $i$ provided at their front ends with heads $i^2$ carrying large and small type $i^3$ and $i^4$ and provided at their rear ends with upwardly directed ears $i^5$ pivoted in the segment $o^3$ at $i^9$ in the usual manner, and said type bars are also provided at their rear ends with downwardly and backwardly directed ears $i^7$ to which are pivoted forwardly directed links $i^8$ which are pivoted at their front ends to cam levers $i^9$ which are pivoted on a transverse rod $j$, and mounted in a transverse bar $j^2$ similar to the transverse bar $h^2$ and held in place by screws $j^3$ passed inwardly through the side plates of the back frame member, and said bar $j$ is provided with kerfs similar to those in the bar $h^2$. It will be observed that the links $i^8$ are pivoted to the upper ends or arm portions of the levers $i^9$, while the lower end or arm portions thereof are provided at their front edges with cam faces $j^4$ on which the rollers $e^4$ in the arms $e^3$ of the key levers $e^2$ operate.

Mounted in the front of the back frame member is a segmentally curved support $j^5$ provided with a cushion strip $j^6$ on which the heads $i^2$ of the type bars $i$ rest.

The space key levers $g^2$ are represented in the back frame member by cam levers $j^7$ which are freely suspended from the rod $j$, and which are provided with front cam faces $j^8$, as shown in Fig. 12, and in connection with which the rollers $g^4$ in the arms $g^3$ of the shift key levers $g^2$ operate, this construction being similar to that of the lower end portions of the cam levers $i^9$.

The shift key levers $f^2$ are represented in the back part of the frame by cam levers $j^9$ shown in Fig. 13, and these cam levers $j^9$ are exactly of the same form as the cam levers $i^9$, and are mounted on the same rod $j$, and their lower end portions are provided with front cam faces $j^{10}$ in connection with which the rollers $f^4$ in the arms $f^3$ of the shift key levers $f^2$ operate, and it will therefore be seen that the printing key levers $e^2$, the shift key levers $f^2$ and the space key levers $g^2$, all operate in connection with levers suspended from the rod $j$ and at each depression or operation of the printing keys $e$, or of the space keys $g$ a universal bar $k$ will be operated, but the operation of the shift keys $f$ or the shift key levers $f^2$ does not affect the universal bar $k$, this result being made possible by reason of the fact that the bar $k$ is shorter than the transverse dimensions of the frame, as shown in Fig. 10, the lower ends of the arms $k^2$ which support said bar being set inwardly to form spaces at the ends of said bar on which the arms $f^3$ of the shift levers $f^2$ operate.

The universal bar $k$ is provided at its ends with arms $k^2$, as shown in Figs. 3 and 10, which are pivoted to the side plates $a^2$ of the back frame member by means of screws $k^3$, and the arms $k^2$ are provided at their upper ends with inwardly set portions $k^4$ with which are connected tension springs $k^5$, which are secured to the side plates of the back frame member at $k^6$, and said springs operate to normally hold the bar $k$ in operative position.

Connected with the upper ends of the cam levers $i^9$ in connection with which the shift key levers $f^2$ operate are links $k^7$ similar to the links $i^8$, and these links $k^7$ are connected at their rear ends with bell crank levers $k^8$ pivoted at $k^9$ to the side plates of the back frame member, and the lower arms of the crank levers $k^8$ are provided with slots $k^{10}$ through which are passed pins $k^{11}$ connected with vertically movable bars $m$ arranged inwardly and bearing on the sides of the back frame member, as shown in Figs. 3 and 4, and pivotally connected with the bars $m$ at different points are link members $m^2$ which are anchored to the sides of the back frame member at $m^3$, and which permit of the vertical movement of the bars $m$, while holding them in proper operative position, as hereinafter described, and the side plates of the back frame member are provided with lugs $m^4$ through which are passed set screws $m^5$, which bear on and limit the movement of the bars $m$, and said bars $m$ are connected with and operate in connection with the platen cylinder carriage as hereinafter described.

The platen cylinder $n$ is supported by a carriage $n^2$ which is mounted in the transverse opening in the top of the back frame member and extends above said frame member. The bars $m$ are provided at the top thereof with cross heads $m^6$ which carry parallel transverse bars $m^7$, and on which are mounted corresponding bars $m^8$ which have a longitudinal movement independent of the bars $m^7$, and between which and the bars $m^7$ are placed ball bearing bars $m^9$, one of which is shown detached in Fig. 16, and in the ends of which are mounted anti-friction balls $m^{10}$, and these balls operate in grooves $m^{11}$ in the bottom of the bars $m^8$ and in the top of the bars $m^7$, as clearly shown in Fig. 3, and the bars $m^9$ are movable longitudinally, or are what are known as floating bars, and the movement thereof is limited by pins $m^{12}$ secured in the ends of said bars $m^8$ and $m^7$ and in the grooves $m^{11}$.

Secured to the outer sides of the bars $m^8$ are hangers $o$ provided at their lower ends with inwardly set rollers $o^2$ which bear on the bottoms of the bars $m^7$ and these hangers and rollers hold the bars $m^7$ and $m^8$ together, and the bars $m^8$ are connected at the top thereof by transverse frame members $o^3$ having raised end supports or frame members $o^4$ and $o^5$, in the front top portion of which trunnions $n^3$ of the platen cylinder $n$ are mounted, and the parts $m^6$, $m^7$, $m^8$, $o^3$ and $o^4$ constitute the body portion or main part of the carriage. The left hand end support or frame member $o^5$ of the carriage is provided at the top thereof with two bearings $o^6$ in which is mounted a rock shaft $o^7$ which ranges forwardly and backwardly and which is provided at its front end with a lever $o^8$ which is fixed to the shaft $o^7$ and at its rear end with an arm $o^9$ to which is pivoted a pawl $p$ which operates in connection with a circular ratchet $p^2$ on the corresponding end of the platen cylinder $n$, and this pawl is held in engagement with said ratchet by a spring $p^3$ which also bears on the bottom face of the arm $o^9$ and holds said arm and the lever $o^7$ in inoperative position, and this constitutes the line spacing mechanism, and secured to the end support $o^5$ of the carriage frame is a leaf spring $p^4$, which carries a knob $p^5$, shown in full lines in Fig. 4, and in dotted lines in Fig. 1, and which operates in connection with the ratchet $p^2$ to regulate and prevent the too free rotation of the platen cylinder.

Mounted on the trunnions of the platen cylinder $n$ are arms $p^6$ which carry the escapement rack bar $p^7$, which occupies the usual position beneath the platen cylinder $n$, and connected with the right hand end of the carriage frame is a strap $p^8$ which is wound on a spring drum $p^9$ beneath the left hand end of the carriage frame, and between the bottom horizontal bars $m^7$ of the carriage, said drum being supported by a hanger $p^{10}$ secured to one of the bars $m^7$, said hanger being provided with a stud pin $p^{11}$ on which the drum $p^9$ is mounted and the strap $p^8$ is secured to said drum, and the drum $p^9$ operates, or is operated in the usual manner to move the carriage to the left in the operation of the machine.

The bottom bars $m^7$ of the carriage are provided approximately centrally thereof with transverse hangers $r$ to which is pivoted a vertically arranged escapement device $r^2$, comprising a vertically arranged bar $r^3$ through the upper end portion of which at $r^4$ is passed a bolt $r^5$ which also passes through the hangers $r$, and pivoted to the upper end portion of the bar $r^3$ at $r^6$ is a block $r^7$ with which is connected a wedge-shaped member $r^8$, the connection of the parts $r^7$ and $r^8$ at $r^9$ being an ordinary elbow joint, and the nose of the wedge-shaped member $r^8$ operates in connection with the teeth of the rack bar $p^7$ as does also the nose or end portion $r^{10}$ of the bar $r^3$. A tension spring $r^{11}$ is connected with the wedge-shaped member $r^8$ and with one of the bottom bars $m^7$ of the carriage and another tension spring $r^{12}$ is secured to the block $r^7$ and to the said bar $m^7$, and these springs operate in opposite directions, all this construction pertaining to the escapement device $r^2$ being old and well known and forming no part of my invention. The bottom of the bar $r^3$ is provided with a slot $r^{13}$ and connected therewith is a link $s$, this connection being made by means of a pin or bolt $s^2$ passed through the slot $r^{13}$, and the link $s$ is shown in Figs. 3, 4 and 17, and the front end thereof is connected with the universal bar $k$ centrally thereof as shown at $s^3$ in Fig. 3.

At the back of the top part of the carriage or platen roller support is mounted a transverse rod $s^4$ on which is mounted a top rock plate $s^5$ and a bottom rock plate $s^6$, the top rock plate $s^5$ being provided with end ears $s^7$, and the bottom rock plate $s^6$ with loops $s^8$ through which the rod $s^4$ passes. Secured to the plate $s^5$ centrally thereof is a supplemental plate $s^9$ having downwardly and forwardly curved fingers $s^{10}$, the object of which is to hold the plate $s^6$ in the full line position shown in Figs. 1 and 3 so as to hold the paper in close connection with the platen cylinder, and when the plate $s^6$ is in the position shown in Figs. 1 and 3, the plate $s^5$ will be in its rearmost position as shown in full lines in Figs. 1 and 3. The plate $s^6$ is provided centrally of the back thereof with ears $s^{11}$ between which is mounted a roller $s^{12}$ which operates through a corresponding opening in said plate as shown at $s^{13}$, and in the operation of the machine, the roller $s^{12}$ bears on the paper that is mounted on the platen cylinder, and another and smaller roller $s^{14}$ is mounted in the front edge portion of the plate $s^6$ and also bears on the paper in the operation of printing, and these rollers serve to guide the paper as it passes around the platen cylinder and also hold it in proper position on said cylinder.

Pivoted to the back of the plate $s^5$ and centrally thereof, as shown at $t$, is a catch $t^2$ provided adjacent to its pivoted support with a finger $t^3$ and at the end with a right-angled hook $t^4$ which is pivoted thereto and when the front frame member $b$ is folded back over the back frame member, as indicated in dotted lines in Fig. 3, the plate $t^5$ is swung forwardly and the finger $t^3$ of the catch $t^2$ passes through an opening $t^5$ in said plate and beneath the front plate $b^2$ of the front frame member, and the hook $t^4$ is folded over the top edge of said plate $b^3$, all as clearly indicated in dotted lines in Fig. 3, and this holds the front frame member in its folded position.

The universal bar $k$ is provided approximately centrally thereof and at the side of the ears $s^3$ with which the escapement link $s$ is connected with ears $t^6$ to which is pivoted a link $t^7$ similar to the link $s$, but which forms a part of the ribbon shift mechanism, and the link $t^7$ extends backwardly and connected with the rear end thereof at $t^8$ is a lever $t^9$ which is pivoted at $u$ in a bracket $u^2$ secured to the segment plate $c^2$, and to the top of which is pivoted a bell crank $u^3$, the longer arm of which extends forwardly and upwardly and is provided with a slot $u^4$ through which passes a cross pin $u^5$ mounted in two ears $u^6$ connected with a vertically movable plate $u^7$, and the plate $u^7$ is provided at its upper end with a yoke-shaped device $u^8$ forming part of a ribbon shift head $u^9$ through which the ribbon $u^{10}$ is passed, and the ribbon $u^{10}$ is mounted on spools $u^{11}$ supported over the opposite side portions of the top of the back frame member in the usual manner, and the shift head $u^9$ is provided with a vertically arranged plate $u^{12}$ the top portion of which is provided with guides $u^{13}$ between which the heads $i^2$ of the type bar members $i$ pass in the operation of printing.

The ribbon shift head $u^9$ is of the usual construction and forms no part of my invention, but with the construction herein shown and described it will be understood that at each backward movement of the universal bar $k$, which movement may be effected either by the type keys $e$, or the space key $g$, and each time that a type key $e$ is operated the ribbon $u^{10}$ is raised into the position shown in Fig. 5 and into the position shown in Fig. 3, and at the same time the corresponding type bar $i$ is operated and thrown into the position shown in dotted lines in Fig. 3, and the type thereon strikes the ribbon and a corresponding impression is made on the paper mounted on the cylinder $n$ and the moment that the key is released the shift head $u^9$ drops into its lowest position and the type bar $i$ returns to its normal position, as shown in full lines in Fig. 3.

Connected with the arms $k^2$ of the universal bar $k$ and approximately centrally of said arms and below the pivotal supports $k^3$ thereof are links $v$ which constitute a part of the ribbon feed mechanism and with which are connected vertically arranged levers $v^2$ pivoted at $v^3$ to the side plates $a^2$ of the back frame member, and the levers $v^2$ are provided at their upper ends with pivoted bars $v^4$ which operate through guides $v^5$ secured to the top plate $a^5$ of the back frame member, and the bars $v^4$ are provided with pivoted spring-operated pawls $v^6$, which operate in connection with ratchets $v^7$ secured on the lower ends of vertically arranged shafts $v^8$ on which the ribbon spools $u^{11}$ are loosely mounted, and the shafts $v^8$ are provided with set nuts $v^9$ by means of which said spools may be secured in position so that they will rotate with the shafts $v^8$, and in the operation of the machine, one of the spools $u^{11}$ is always loose on its corresponding shaft, while the other is secured to its shaft, and this result is best accomplished by means of collars $v^{10}$ secured on the bottom portions of the shafts $v^8$ and on which the spools $u^{11}$ rest, and it will be understood that in the operation of the machine the spools $u^{11}$ turn in opposite directions alternately according to the direction in which the ribbon is moving, and in order to accomplish this result the ratchets $v^7$ on the opposite sides of the machine are turned in opposite direction.

The escapement rack bar $p^7$ is provided centrally with a spiral spring $w$ which is secured to the front bar $m^3$ of the carriage frame, and said spring serves to hold the bar $p^7$ in contact with downwardly directed stops $w^2$ with which the transverse carriage frame members $o^3$ are provided, and by means of this construction the bar is normally held in connection with the part $r^3$ of the escapement device $r^2$.

The operation will be readily understood from the foregoing description when taken in connection with the accompanying drawing and the following statement thereof. The carriage frame is manipulated in one direction by the operation of the escapement device $r^2$, or this operation may be effected by means of the handles $w^3$ of the arms $p^6$, but said carriage is moved in the opposite direction by means of the lever $o^8$, and this operation is necessary at the end of each printed line and is similar to that of other machines of this class.

It will be understood that the platen cylinder carriage $n^2$ is vertically movable, said carriage being raised by each downward movement of the shift keys $f$, or one of them, and normally drops back by gravity after pressure on said key or keys is removed, and in this operation the links $m^2$ prevent any lateral movement of said carriage, and this raising of the carriage is effected each time that it is desired to print a letter or character in upper case.

The construction of the operation of the various parts, or groups of parts, has been set out in connection with the detail description of said parts and the general assemblage of all of the parts and the operation thereof, except as herein defined, is similar to that of other machines of this class and will be readily understood by all those familiar with such machines and the operation thereof.

From the foregoing description it will be seen that the parts $e^2$, $i^8$ and $i^9$ constitute, in effect, divided key bars for operating the type bars $i$ and it will also be seen that the distinctive elements of this construction are the levers $i^9$.

Having fully described my invention, what I claim as new and desire to secure by Letters Patent, is;—

1. In a typewriting machine, a frame composed of a back part and a front part, said front part being provided with a standard key board comprising writing-key levers, space-key levers and shift-key levers, said key levers being pivotally suspended in said front part and being provided with downwardly and backwardly directed arms adapted to operate in the back part, and said back part being provided with transversely arranged pivoted cam levers which equal in number said key levers and in connection with which said key levers operate.

2. In a typewriting machine, a frame composed of back and front parts, the front part being provided with a standard key board comprising writing key levers, space key levers and shift key levers, and said back part being provided with a transversely arranged row of pivoted cam levers which equal in number said key levers and in connection with which said key levers operate, the back part being also provided rearwardly of said cam levers with a transversely and pivotally supported universal bar in connection with which the cam levers which correspond with the writing key levers and space key levers operate.

3. In a typewriting machine, a frame composed of back and front parts, the front part being provided with a standard key board comprising writing key levers, space key levers and shift key levers, and said back part being provided with a transversely arranged row of pivoted cam levers which equal in number said key levers and in connection with which said key levers operate, the back part being also provided rearwardly of said cam levers with a transversely and pivotally supported universal bar in connection with which the cam levers which correspond with the writing key levers and space key levers operate, said universal bar being shortened at its ends to permit of the independent operation of the shift key levers and their corresponding cam levers.

4. In a typewriting machine, a frame composed of front and back parts, the front part being provided with a standard key board comprising writing key levers, space key levers and shift key levers, said back part being provided with a transversely arranged row of pivoted cam levers which equal in number said key levers, and in connection with which said key levers operate, the back part being also provided rearwardly of said cam levers with a transversely arranged and pivotally supported universal bar in connection with which the cam levers which correspond with the writing key levers and space key levers operate, said universal bar being shortened at its ends to permit of the independent operation of the shift key levers and their corresponding cam levers.

5. In a typewriting machine, a frame composed of a front part, and a back part hinged to the front part and adapted to be folded thereover, said front part being provided with a standard key board comprising writing key levers, space key levers and shift key levers, and said back part being provided with a transversely arranged row of pivoted cam levers which equal in number said key levers and in connection with which said key levers operate.

6. In a typewriting machine, a frame composed of a back part, and a front part secured to said back part and adapted to be folded backwardly thereover, said front part being provided with a key board comprising writing-key levers, space-key levers and shift-key levers, all pivotally suspended in the front part and provided with downwardly and backwardly directed arms adapted to extend into the back part, and said back part being provided with a series of corresponding cam levers adapted to be actuated by said key-levers.

7. In a typewriting machine, a frame composed of a back part, and a front part secured to said back part and adapted to be folded backwardly thereover, said front part being provided with a key board comprising writing-key levers, space-key levers and shift-key levers, all pivotally suspended in the front part and provided with downwardly and backwardly directed arms adapted to extend into the back part, and said back part being provided with a series of corresponding cam levers adapted to be actuated by said key levers, a universal bar mounted behind said cam levers and operable by the cam levers actuated by the writing-key levers and space-key levers; said shift-key levers and their associated cam levers being operable independently of said universal bar; substantially as described.

In testimony that I claim the foregoing as my invention I have signed my name in presence of the subscribing witnesses this 29th day of July 1912.

ERNEST H. ALBERTSON.

Witnesses:
S. ANDREWS,
C. MULREANY.